(12) United States Patent
Lee et al.

(10) Patent No.: US 8,262,219 B2
(45) Date of Patent: Sep. 11, 2012

(54) EYEWEAR EARSTEM DEVICES AND METHODS

(75) Inventors: Duane J. Lee, Orange, CA (US); Kevin K. Grant, Lake Forest, CA (US); An Tran, Austin, TX (US)

(73) Assignee: Oakley, Inc., Foothill Ranch, CA (US)

( * ) Notice: Subject to any disclaimer, the term of this patent is extended or adjusted under 35 U.S.C. 154(b) by 27 days.

(21) Appl. No.: 12/986,971

(22) Filed: Jan. 7, 2011

(65) Prior Publication Data

US 2011/0170052 A1 Jul. 14, 2011

Related U.S. Application Data

(60) Provisional application No. 61/293,591, filed on Jan. 8, 2010.

(51) Int. Cl.
*G02C 5/16* (2006.01)

(52) U.S. Cl. .................................. 351/122; 351/123

(58) Field of Classification Search .............. 351/117, 351/122, 123, 111, 119
See application file for complete search history.

(56) References Cited

U.S. PATENT DOCUMENTS

| | | | |
|---|---|---|---|
| 2,561,402 A * | 7/1951 | Nelson | 351/123 |
| 3,953,114 A * | 4/1976 | Bidgood | 351/123 |
| 4,548,484 A | 10/1985 | Ehring | |
| 5,137,342 A | 8/1992 | Jannard et al. | |
| 5,321,442 A | 6/1994 | Albanese | |
| RE34,836 E | 1/1995 | Murrell | |
| 5,583,583 A * | 12/1996 | Wilson | 351/41 |
| 5,708,491 A * | 1/1998 | Onodera et al. | 351/122 |
| 5,969,788 A | 10/1999 | Largura | |
| 6,565,208 B1 * | 5/2003 | Lee | 351/122 |
| 6,938,277 B2 | 9/2005 | Lindahl | |
| 7,040,753 B2 | 5/2006 | Aylor | |
| 7,055,952 B2 * | 6/2006 | Fecteau et al. | 351/122 |

OTHER PUBLICATIONS

International Search Report and the Written Opinion for Application No. PCT/US2011/020586 filed Jan. 7, 2011 (13 pages).

* cited by examiner

*Primary Examiner* — Hung Dang
(74) *Attorney, Agent, or Firm* — Knobbe Martens Olson & Bear, LLP (57) ABSTRACT

An earstem for eyeglasses is provided that can incorporate an interchangeable elastomeric traction member disposed in a recessed seat which extends along a length of the earstem to provide a contact area between the earstem and the head. The traction member can be disposed along the bottom portion of the earstem and/or around the periphery of the earstem. The traction device can be detachably coupled to the earstem so that the traction device can be exchanged to accommodate different needs or situations.

19 Claims, 8 Drawing Sheets

EYEWEAR EARSTEM DEVICES AND METHODS

CROSS-REFERENCE TO RELATED APPLICATIONS

The present application claims priority under 35 U.S.C. §119(e) to U.S. Provisional Application No. 61/293,591 filed on Jan. 8, 2010, the disclosure of which is incorporated by reference herein in its entirety.

BACKGROUND

1. Field of the Inventions

The present inventions relate generally to eyewear and, more particularly, to earstem devices for improving the traction retention, comfortable fit, or aesthetic appearance of the eyewear, and methods for making and using the same.

2. Description of the Related Art

A wide variety of improvements have been made in recent years in the eyewear field, particularly with respect to eyewear intended for use in active sports or as fashion sunglasses. These eyewear designs accomplish a variety of functional advantages, such as maximizing interception of peripheral light, reducing optical distortion and increasing the wearer's comfort level, compared to previous active sport eyewear.

Eyewear frames are typically made in a standard size and do not conform to the particular contours of an individual's head. Rather, stock frames are generally constructed to conform to an idealized "standard" anatomical head. As a result, such frames often result in a fit which is either too tight or too loose about the head of some individuals. A tight fitting frame may cause localized discomfort, pain, and headaches, while a loose fitting frame may allow the eyewear to fall from the head and damage the frame or the lens. This is particularly disadvantageous for protective eyewear such as sunglasses which are to be used in active sports, such as bicycle racing or skiing. Additionally, in the event that corrective lenses vary in weight between the lenses, the uneven weight distribution may cause frames to locally abrade the skin.

SUMMARY

In accordance with some embodiments, the eyewear earstems include a flexible earstem member configured to contact a user's head on or near the ears and/or in the temple region, to provide more traction, a more secure fit, and/or a more comfortable fit that is less prone to slippage during use. In some embodiments, the earstem member can be removable and replaceable after excessive wear or damage or to achieve a different fit or aesthetic look. The earstem member can include a first generally tubular portion configured to axially receive a portion of the earstem and a second generally trough-shaped portion configured to extend circumferentially around less than the entire periphery of at least a portion of the earstem. In some embodiments, the earstem member and the earstem can include complimentary interface or retainer structures to help secure the earstem member to the earstem in a manner that is removable but generally securely remains in place during active use of the eyewear.

BRIEF DESCRIPTION OF THE DRAWINGS

Various features of some embodiments of the inventions disclosed herein are described below with reference to the drawings. The illustrated embodiments are intended to illustrate, but not to limit, the inventions. The drawings contain the following figures.

DETAILED DESCRIPTION

While the present description sets forth specific details of various embodiments, it will be appreciated that the description is illustrative only and should not be construed in any way as limiting. Additionally, it is contemplated that although particular embodiments of the present inventions may be disclosed or shown in the context of dual lens eyewear systems, embodiments can be used in many different types of eyewear, including but not limited to unitary and dual lens eyewear systems. Further, it is contemplated that although particular embodiments of the present inventions may be disclosed or shown in the context of frames having full orbitals, such embodiments can be used with frames having full or partial orbitals or rimless frames. Furthermore, various applications of such embodiments and modifications thereto, which may occur to those who are skilled in the art, are also encompassed by the general concepts described herein.

As used in the present application, "eyewear" and "eyeglasses" are general terms intended to be used in accordance with their ordinary meanings. For example, these terms embrace any optical devices, such as those containing corrective lenses for defects in vision or lenses for such special purposes as filters for absorbing or blocking portions of the electromagnetic spectrum, providing physical shields for the eyes or making available other physical or optical functions for protective or visual assisting purposes.

Figure 1:
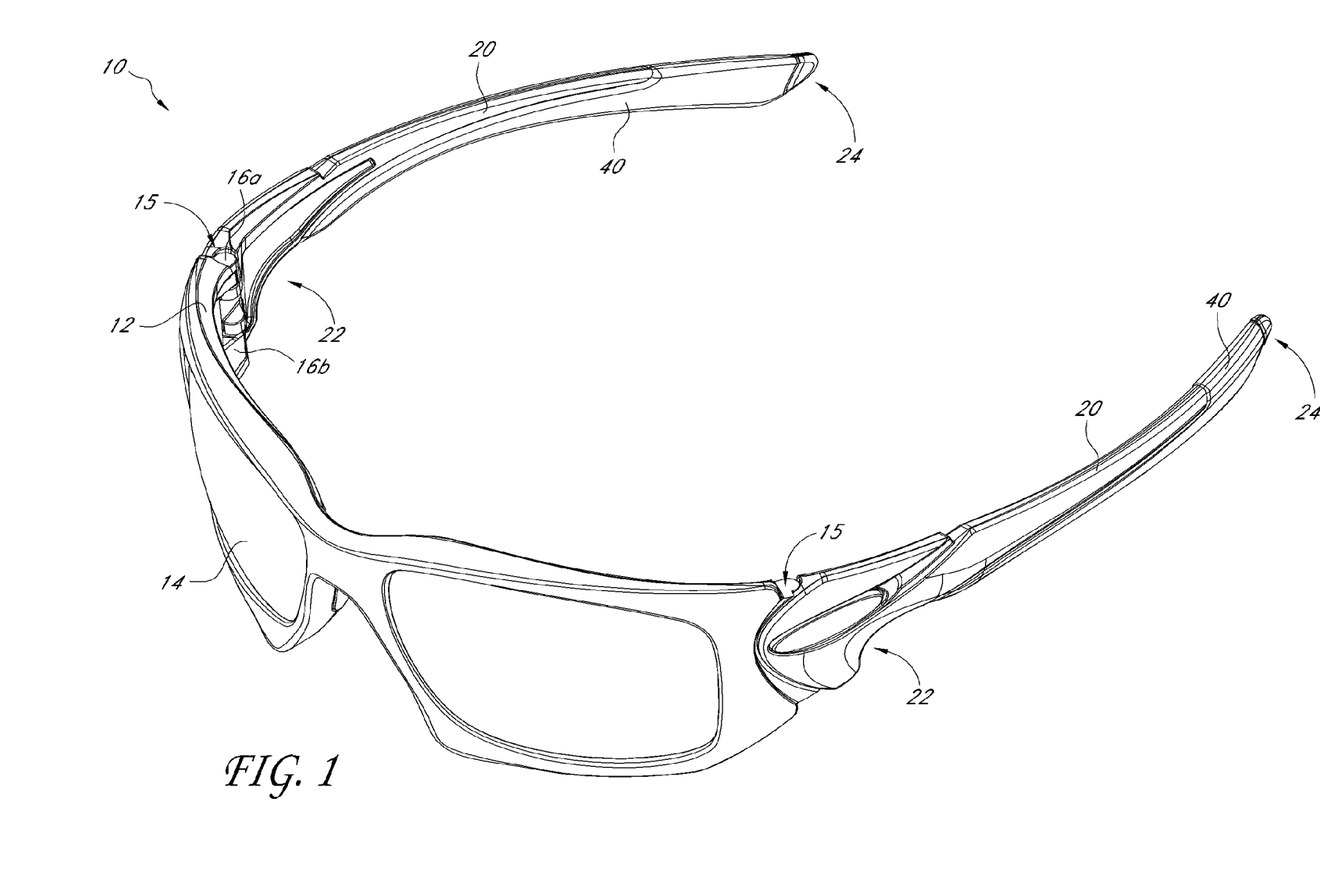
FIG. 1 is a front, right perspective view of eyewear in accordance with an embodiment of the present inventions.

As shown in FIG. 1, eyewear 10 adapted to position a lens in a predetermined orientation relative to the eyes can include a frame 12, lens 14 and earstems 20. The earstems 20 can be pivotally affixed or joined to the frame 12 at respective joints 15. The joints 15 can enable the earstems 20 to be selectively pivoted between a stowed position and a deployed position. As illustrated in FIG. 1, the earstems 20 are positioned in the deployed position, ready for use. Although the earstems 20 are shown in FIG. 1 as pivotally affixed to the frame 12, the earstems 20 may be permanently attached in a predetermined orientation or selectively engageable with the frame 12 without circumventing the scope of the present invention. Alternatively, the frame 12 may be eliminated entirely by securing the earstems 20 with or without earstem hinges directly to the lens 14 by thermoplastic bonding, adhesives screws or other fastening means which are suitable for the material of the lens and earstems.

In some embodiments, the frame 12 and earstems 20 can be fabricated using metals, polymers, or other relatively stiff materials that can have desirable lens securing and stabilizing properties while nevertheless enabling the eyewear to provide desirable flexural properties in the earstems 20 thereof. For example, in some embodiments, titanium, carbon fiber, plastic, aluminum, and other such materials can be used in the frames 12 and/or earstems 20 to provide superior mechanical properties while reducing the weight of the eyeglass. Any suitable metals, plastics or other rigid materials can be used to form the eyeglass to provide exceptional rigidity, durability, and wear resistance. Nevertheless, various features and aspects disclosed herein can be used in eyeglasses fabricated from any material, e.g., plastic, acetate, composite, metal, etc., or any combination thereof. The lens 14 may take any of a number of configurations and can be formed of sheet plastic, molded plastic, glass, etc., as determined by the application of the lens.

Each earstem 20 can include an anterior end 22 and a posterior end 24, wherein the anterior end 22 is affixed either permanently or detachably to the frame 12 and the posterior end 24 is generally free. The earstems 20 can be made of any suitable material, such as plastic, acetate, composite, metal, etc. A permanent attachment of the earstems to the frame 12 may be accomplished, for example, through molding or thermoplastic bonding. A detachable engagement of the earstems 20 and the frame 12 can be provided by various methods, such as with the use of a snap fit or fasteners including screws or pins.

Figure 3:
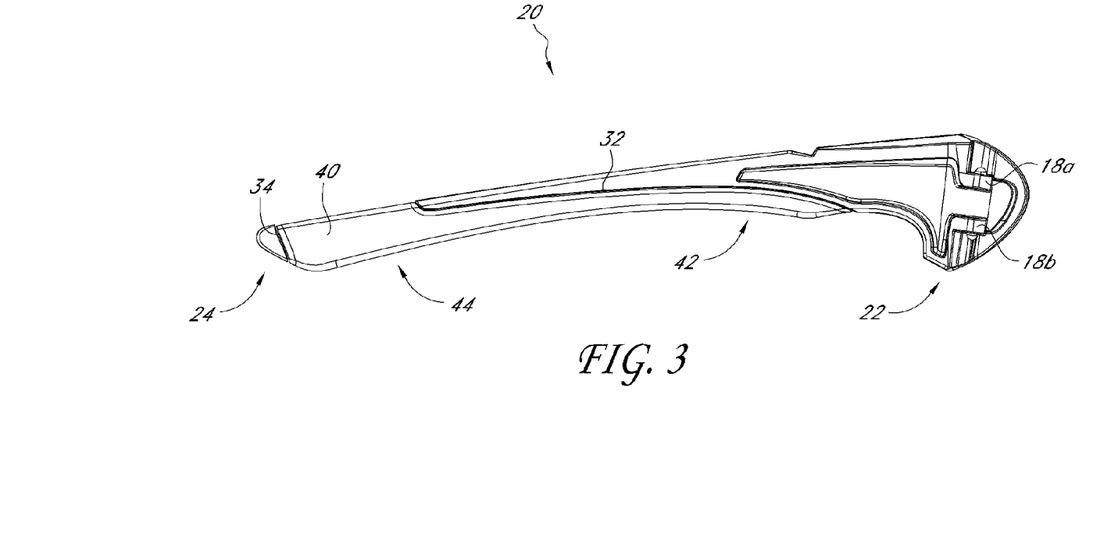
FIG. 3 is a right side elevational view of the earstem of FIG. 2.
Figure 4:
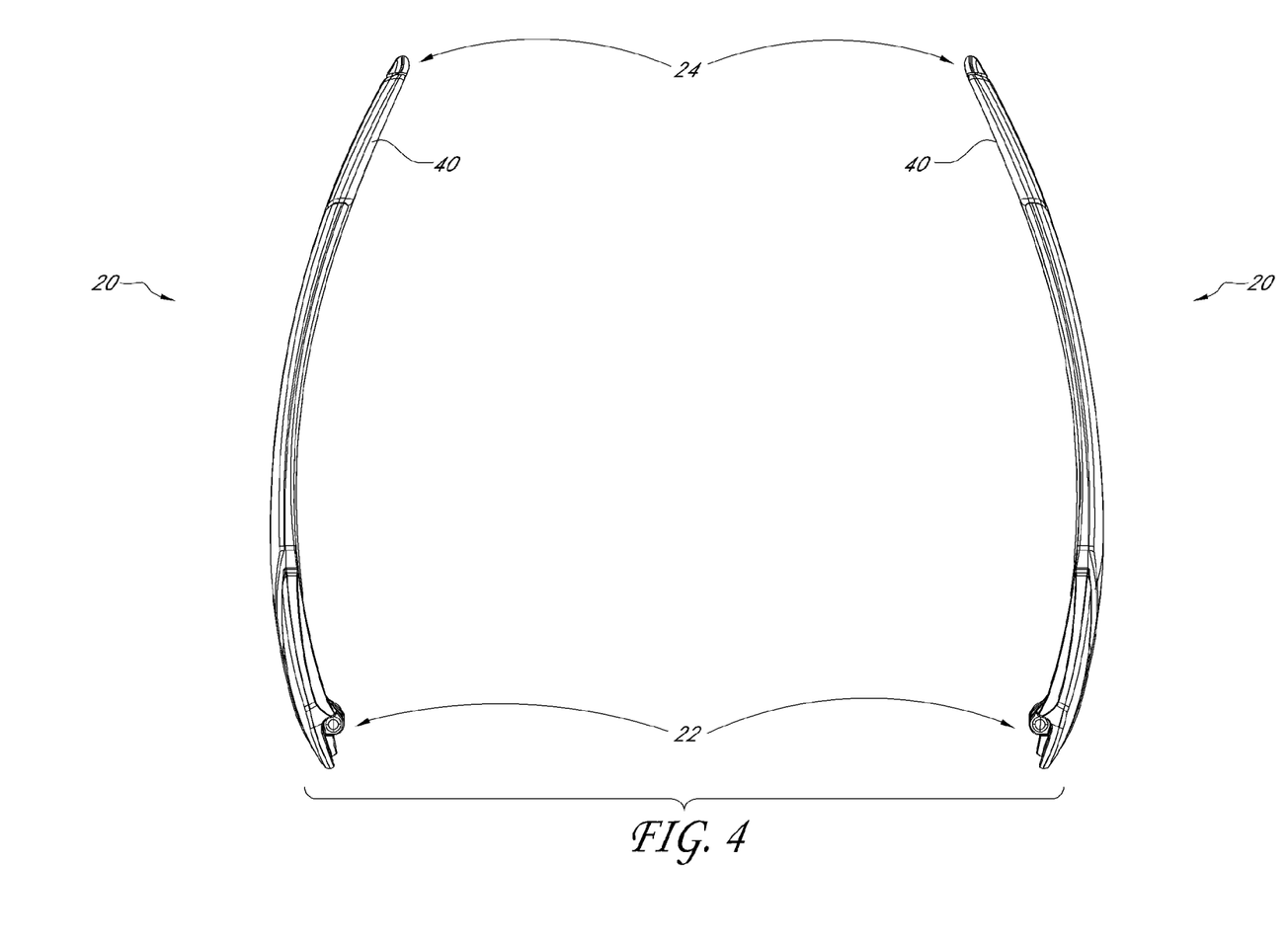
FIG. 4 is a top plan view of earstems of the eyewear of FIG. 1.

As shown in FIG. 1, in some embodiments, the eyewear includes a detachable hinge connection. The frame 12 or lens 14 can include hinge apertures (not illustrated) disposed on the inner surfaces of the upper and lower frame flanges 16a, 16b, such that the apertures are open toward each other. As illustrated in FIG. 3, the earstems 20 can include a pair of parallel earstem flanges 18a, 18b with protrusions (not illustrated) on the outer surfaces that extend in opposite directions. The earstem flanges 18a, 18b can be inserted by deformation of the frame flanges 16a, 16b and/or the earstem flanges 18a, 18b, wherein the protrusions snap into the apertures, thereby providing a readily detachable hinge. In other embodiments, the apertures can be disposed on the outer surfaces of the earstem flanges 18a, 18b and the protrusions can be disposed on the inner surfaces of the frame flanges 16a, 16b.

In some embodiments, hinge apertures can extend through the frame flanges 16a, 16b and earstem flanges 18a, 18b. The apertures in the earstem flanges 18a, 18b can be aligned with the apertures of the frame flanges 16a, 16b and a pin can be inserted so as to permit rotation of the frame 12 or lens 14 relative to the earstems 20, thereby providing a hingeable connection. In other embodiments, other hingeable connections known in the art are contemplated, such as hingeable connections that are readily detachable.

In some embodiments, the eyewear can include a curved portion at or near the posterior end 24 of the earstem to provide loops or bends which can be positioned behind the ears when the eyewear is worn. However, the earstem can impinge upon the head in undesired locations when employed on heads of different sizes. Hence, in some embodiments as illustrated in FIGS. 1-3, the eyewear can include a generally straight earstem which can provide more universally fitting eyewear and can eliminate the traditional ear hook which can cause discomfort or distraction for many wearers.

Figure 2:
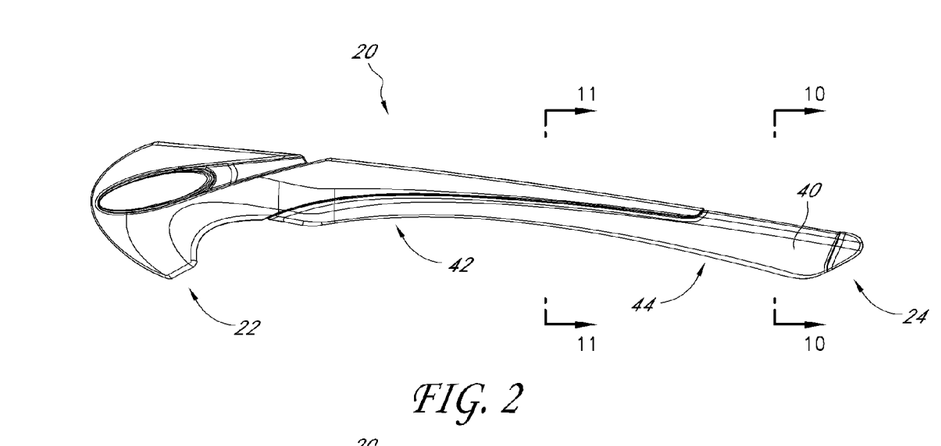
FIG. 2 is a left side elevational view of an earstem of the eyewear of FIG. 1.
Figure 5:
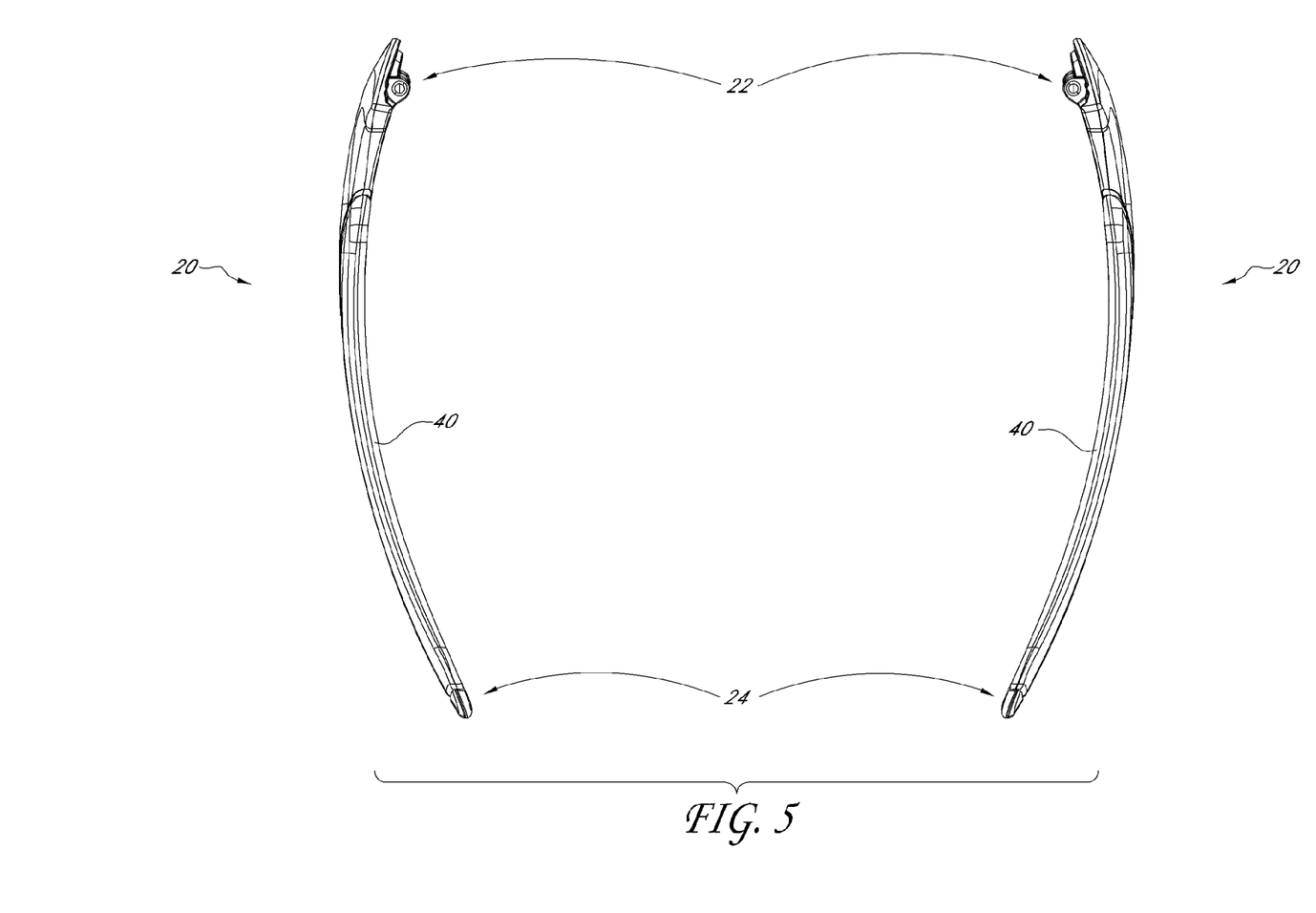
FIG. 5 is a bottom plan view of earstems of the eyewear of FIG. 1.
Figure 6:
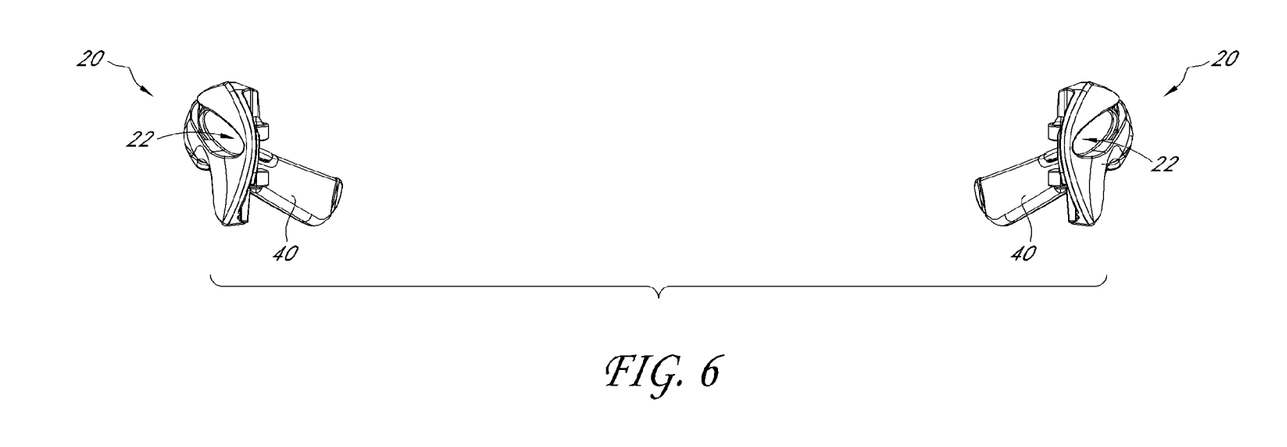
FIG. 6 is a front elevational view of earstems of the eyewear of FIG. 1.
Figure 7:
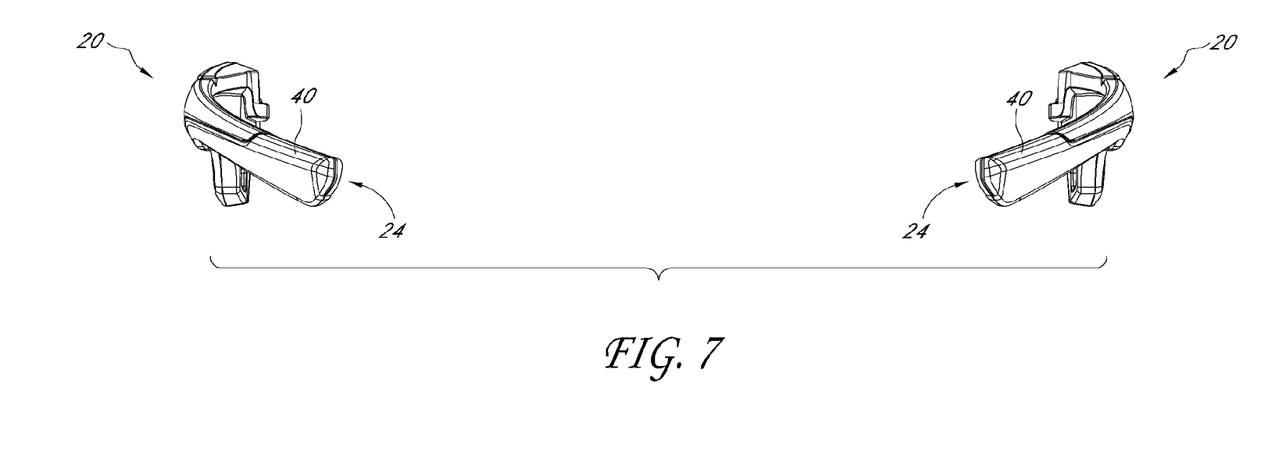
FIG. 7 is a rear elevational view of earstems of the eyewear of FIG. 1.

As illustrated in FIGS. 2, 3 and 5, an earstem member, such as a traction member 40, can cover a lower portion of the earstem 20 so that at least a portion of the traction member 40 contacts or abuts a portion of the wearer's head, such as an upper portion of a wearer's ear, when the eyewear is used. In the illustrated embodiment, the traction member 40 extends over the lower portion of nearly the entire length of the earstem 20 to comfortably accommodate various head sizes of wearers in a generally stable manner and to provide a relatively long region for comfortably and more securely gripping the eyewear when holding it in the hands or when positioning it on a wearer's face. In some embodiments, the length of the traction member 40 can range from approximately half to approximately the entire length of the earstem. In some embodiments, as illustrated, at least about three-quarters of the lower edge of the earstem is generally covered by the traction member 40.

Figure 12:
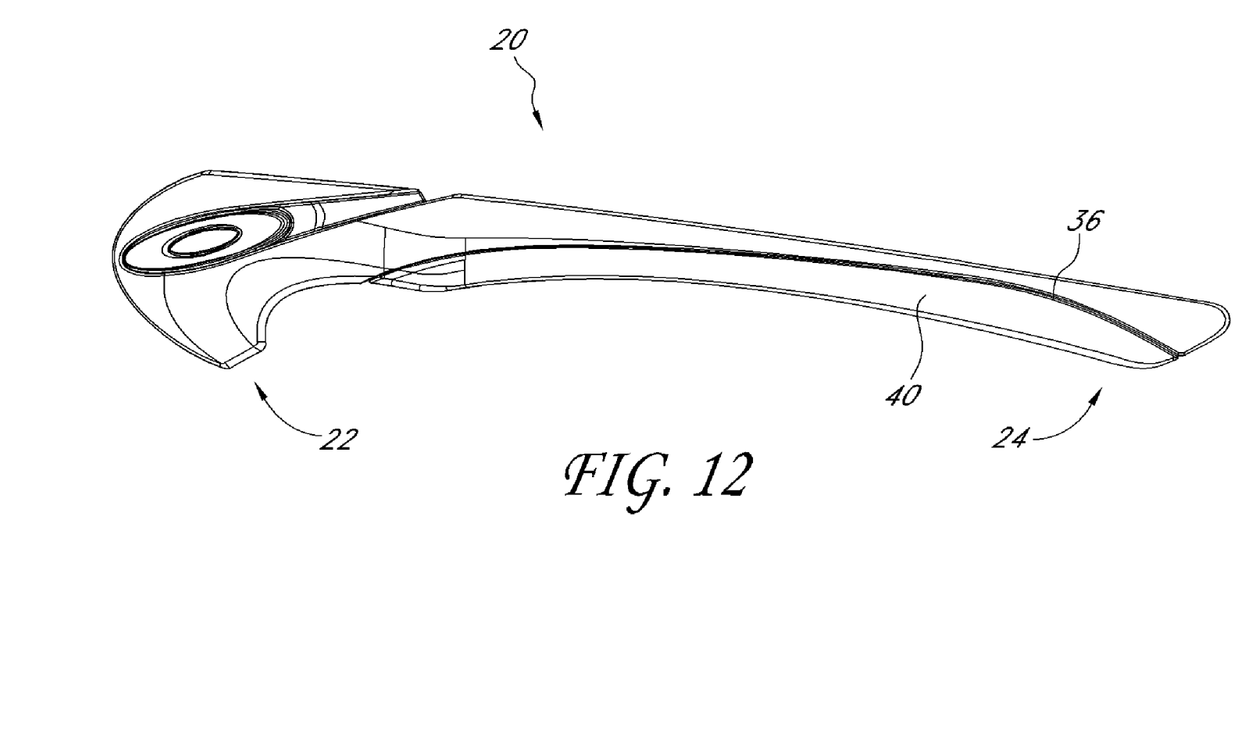
FIG. 12 is a left side elevational view of eyewear in accordance with another embodiment of the present inventions.

As illustrated in FIGS. 2, 3, 4 and 7, in some embodiments the traction member 40 can have a portion that generally or entirely extends around, or that generally or entirely surrounds, the earstem 20. In other embodiments, as illustrated in FIG. 12, the traction member 40 may extend along only one side (e.g., the lower portion) of the earstem 20 without a portion that extends along the other side (e.g., the upper portion) of the earstem 20. The traction member 40 can extend partially around the periphery of the earstem along a portion of its axial length, such as along a majority, or approximately all, of its axial length. In some embodiments, such configurations can provide a generally rigid surface along the upper edge of the earstem 20 and a generally resilient or generally soft-contact surface along the lower edge of the earstem 20.

Figure 8:
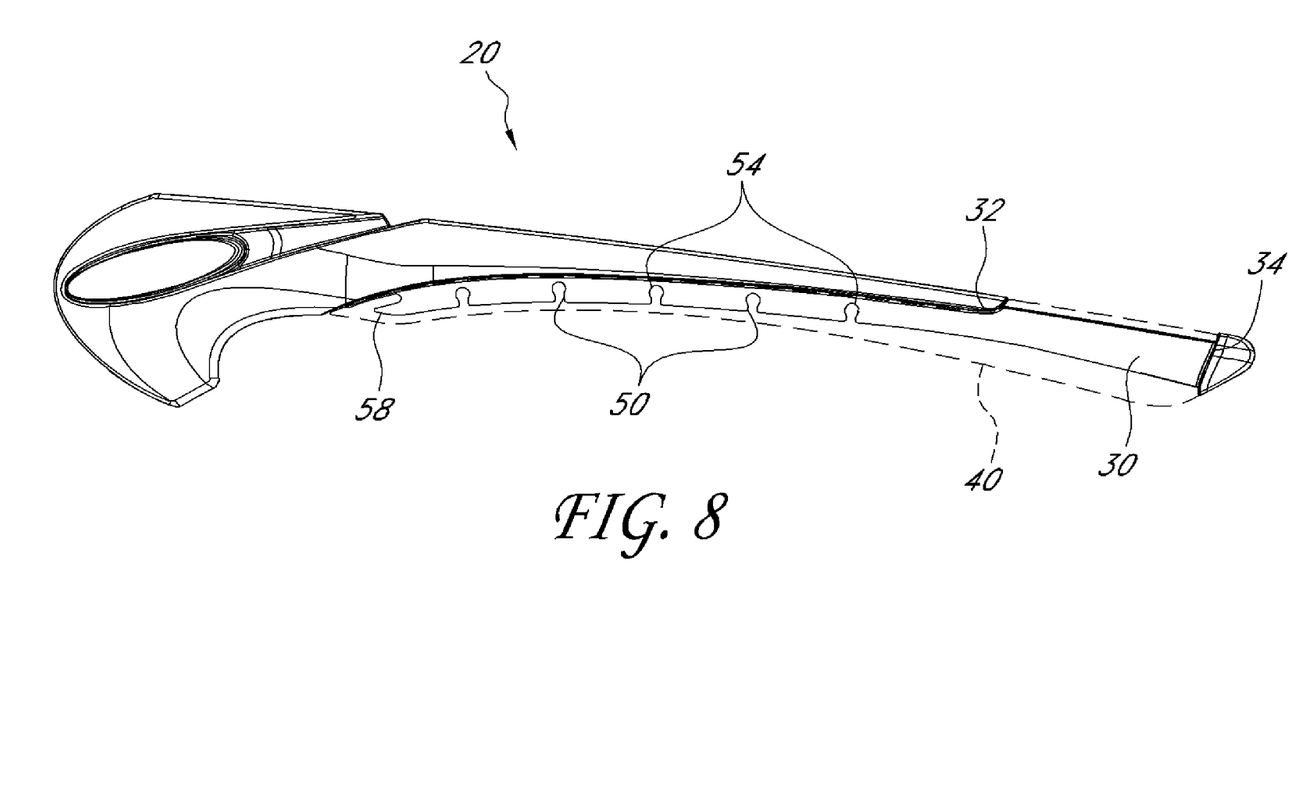
FIG. 8 is a side elevational view of the earstem of FIG. 2 with the traction member shown transparently.

With reference to FIG. 8, a recessed seat 30 can be disposed intermediate of the anterior and posterior ends 22, 24 of the earstem 20. In some embodiments, the length and shape of the recessed seat 30 can generally correspond to the length and shape of the traction member 40 so that the traction member 40 can fit closely within and be securely bounded by the recessed seat 30. In some embodiments, as illustrated, the outer surface boundaries between the outer surfaces or edges of the earstem 20 and the traction member 40 are generally smooth and continuous, without substantial gaps or substantial changes in shape or contour, along approximately all or a portion of the length of the earstem 20, so that the traction member 40 appears generally to be an integral or complementary part of the earstem 20 and so that debris does not accumulate along the boundaries. In some embodiments, the traction member 40 can be attached to or extend across approximately all or a portion of the earstem 20 without any recessed seat 30.

Figures 9, 10, 11:
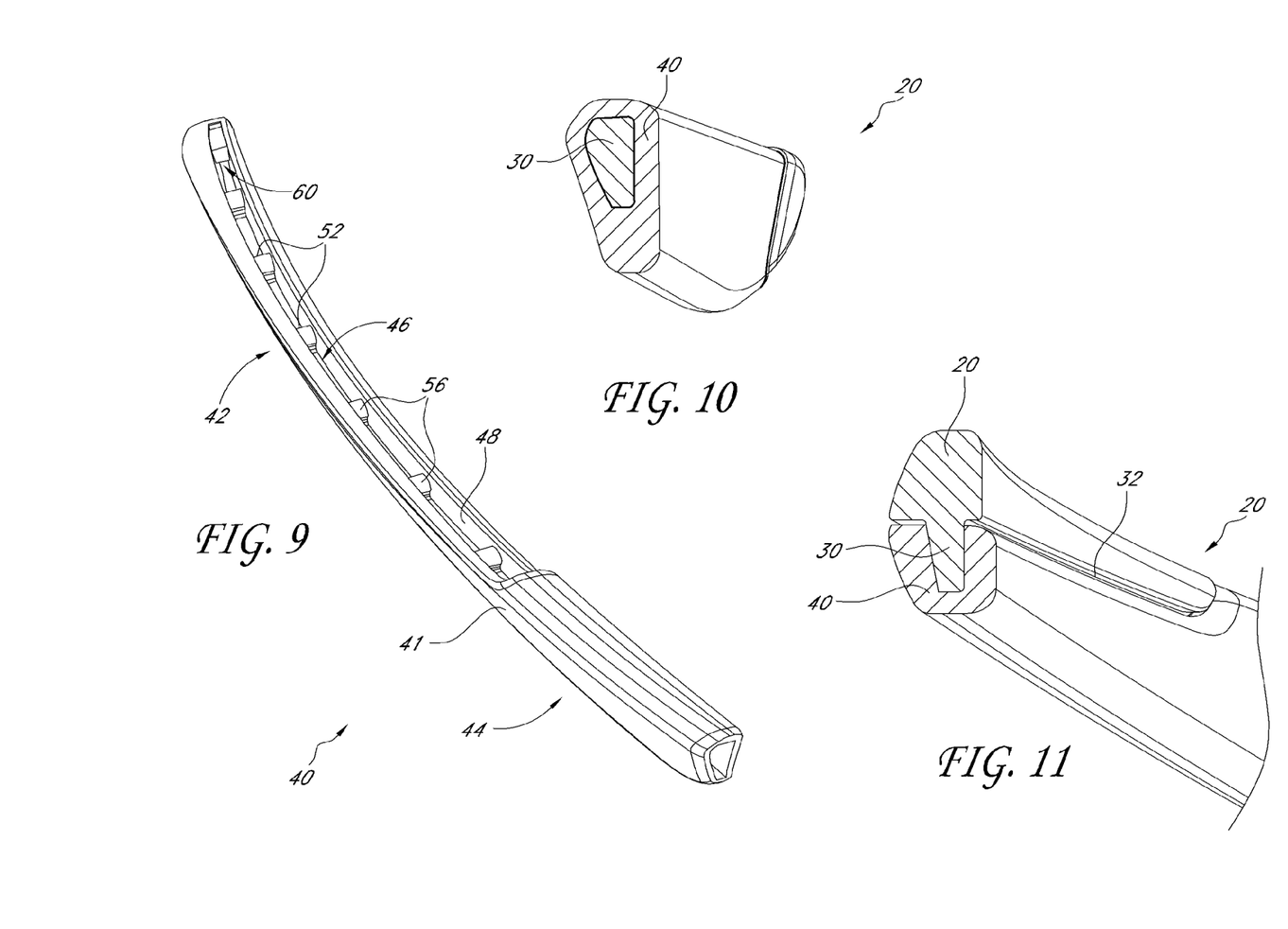
FIG. 9 is a rear, left perspective view of a traction member of FIG. 2.
FIG. 10 is a cross sectional view taken along line 10-10 of FIG. 2.
FIG. 11 is a cross-sectional view taken along line 11-11 of FIG. 2.

In the illustrated embodiment, the recessed seat 30 extends over the lower portion of a majority of the length of the earstem 20. The recessed seat 30 can include a first portion 37 that has a reduced outer surface cross-section around the entire (or nearly the entire) perimeter of the earstem 20, as illustrated in FIG. 10, and the recessed seat 30 can include a second portion 39 that has a reduced outer surface cross-section around less than the entire perimeter of the earstem 20. The second portion 39 of the recessed seat 30 can include an axially extending shoulder 31, which in some embodiments can extend generally diagonally across at least a portion of the length (or generally the entire length) of the earstem 20. In the illustrated example, the axially extending shoulder 31 extends from an upper portion on the sidewall of the earstem 20 that is closer to the posterior end 24 to a lower portion on the sidewall of the earstem 20 that is closer to the anterior end 22. In some embodiments, as illustrated, the portion of the earstem 20 across which the axially shoulder 31 extends is substantially axially longer than the portion of the earstem 20 where the recessed seat extends generally completely around the circumference of the earstem 20. The axially extending shoulder 31 can have a generally curvilinear shape as illustrated. In some embodiments, the first portion 37 is located in the posterior region of the earstem 20 and the second portion 39 is located in the anterior region of the earstem 20. The first portion 37 can be substantially shorter than the second portion 39. In some embodiments, all or nearly all of the recessed seat 30 is structured as in the first portion 37, and in other embodiments, all or nearly all of the recessed seat 30 is structured as in the second portion 39. In some embodiments, there can be multiple recessed seats 30 and traction members 40 with axial spaces between them.

The term "recessed seat" is intended to have its ordinary meaning. In the illustrated embodiment (but not in all embodiments), the recessed seat 30 can be defined by a posterior shoulder 34, an intermediate shoulder 32, and an anterior shoulder 33. The intermediate shoulder 32 is disposed between the posterior shoulder 34 and the anterior shoulder 33. The cross-sectional dimension of the recessed seat 30 between the anterior and posterior shoulders 32, 34 can be smaller than the cross-sectional dimension of the adjacent portions of the earstem 20, as illustrated in FIGS. 8 and 11, for example.

In some embodiments, such as some in which the traction member 40 extends along only the lower or upper side of the earstem 20 or around less than the entire perimeter of the earstem 20, the recessed seat 30 can be defined by a posterior shoulder 36 and an anterior shoulder 38, as illustrated in FIG. 12, or by a single shoulder 36, 38 in suitable configurations. The cross-sectional dimension of the recessed seat 30 below the shoulders 36, 38 can be smaller than the cross-sectional dimension of the earstem 20 above the shoulders 36, 38.

In some embodiments, such as some in which the recessed seat 30 includes a single shoulder (such as the posterior shoulder 34), the cross-sectional area of the seat can taper from being substantially flush with a portion of the earstem 20 to a reduced cross-sectional area at the shoulder. The single shoulder can thereby prevent unintentional axial displacement of the traction member 40 in one direction. Axial displacement of the traction member in the other direction can be inhibited by the expanding cross-sectional area of the seat in a tapered embodiment, or by other means such as a friction fit. In some embodiments, axial displacement can be inhibited by additional retaining structures in the recessed seat 30, as described further below.

Referring to FIG. 9, an example of an elongate, resilient traction member 40 is shown. The traction member 40 can have many different material properties, such as flexibility, pliability, and enhanced gripping capability. In some embodiments, the traction member 40 can include a first portion 42 that is formed with a generally upwardly oriented opening or cavity 46 that is generally open along the top surface and is configured to interface with the lower surface of the earstem 20 in the recessed seat 30. For some embodiments in which the first portion is configured to be positioned along the top edge of the earstem, the cavity can be open along the bottom surface. As illustrated, the first portion 42 can take the form of an elongate body that is split axially along the top wall so that it forms a generally trough-shaped, partial tubular body and not a completely closed tube.

In some embodiments, a second portion 44 can include a generally hollow, generally closed tubular body 44 configured to generally fit around the recessed seat 30. The tubular body 44 can have many different cross-sectional shapes, such as generally circular, generally square, generally triangular, generally elliptical, etc. The tubular body 40 can be completely closed and continuous around its perimeter or it can include openings or perforations. In some embodiments, the traction member 40 can be stretchable or expandable to permit passage of a portion of the earstem through a bore therein, such as the posterior end 24 of the earstem 20, without exceeding the elastic limits of deformation of the traction member 40.

In the embodiment illustrated in FIG. 10, the traction member 40 has a generally trapezoidal cross-sectional shape. In some embodiments, the cross-sectional shape of the traction member 40 is complimentary to the cross-sectional shape of the earstem 20 so that the assembled earstem 20 and traction member 40 form an integrated and continuous shape, such as for example the polygonal shape illustrated in FIG. 11.

In some embodiments, the traction member 40 has a similar or corresponding thickness to the depth of the recessed seat 30 so that the outer surface 49 of the traction member 40 is generally aligned with the outer surface of the earstem 20 when the two components are assembled, as illustrated in FIG. 11. When the traction member 40 is generally flush with the adjacent earstem 20, it can provide an improved aesthetic appearance of the eyewear by helping to create a sleek, integrated appearance of the eyewear. In other embodiments, the traction member 40 can extend beyond the periphery of the earstem 20, or conversely the earstem 20 can extend beyond the periphery of the traction member 40.

In some embodiments, at least a portion of the earstem 20 and at least a portion of the traction member 40 can include interfacing structures to increase or complicate the forces required to separate them. In this way, the traction member 40 is less likely to inadvertently become detached from the earstem 20 during use. For example, in some embodiments, the recessed seat 30 can have a retention structure for securing the traction member 40 to the earstem 20. As illustrated in FIG. 8, the recessed seat 30 can include a plurality of slots 50 on the lower edge of the recessed seat 30 for accepting a plurality of complimentary ridges 52 of the traction member 40. Of course, the locations and/or orientations of the respective slots 50 and ridges 52 can be reversed or otherwise modified, and also one or more of each type of retention structure can be included on both the earstem 20 and traction member 40. The ridges 52 on the traction member 40 can be inserted into the slots 50 of the recessed seat 30 such that the friction between the ridges 52 and the slots 50 and/or the tension in the traction member 40 can help secure the traction member 40 to the earstem 20. In the illustrated embodiment, the recessed seat 30 has five slots 50 disposed on the first portion 42. In other embodiments, there can be less or more slots 50. In some embodiments, the slots 50 can be disposed on the second portion 44 in addition to or instead of the first portion 42. In addition to or instead of using integrated interfacing and retaining structures, the traction member 40 and the earstem 20 can be attached to each other using adhesive, thermobonding, overmolding, sonic welding, solvent bonding, or any other suitable methods or materials.

With continued reference to FIG. 8, the retention structure can include one or more closely fitting engaging structures, for example the slots 50 can include an enlarged portion 54 at the apical end of the slots 50. The traction member 40 can include an enlarged or bulbous portion 56 at the top end of the ridges 52. As the traction member 40 is coupled to the earstem 20, the bulbous portion 56 can deform as it is inserted into the enlarged portion 54 and then the bulbous portion 56 can at least partially rebound to its original size and shape. The bulbous portion 56 can provide an interference fit with the enlarged portion 54 to help secure the traction member 40 to the earstem 20 and to help prevent the traction member 40 from unintentionally separating from the recessed seat 30. In the illustrated embodiments, the bulbous portion 56 and/or enlarged portion 54 have a generally circular cross-sectional shape. However, in other embodiments, the shape of the bulbous portion 56 and/or enlarged portion 54 can be any other shape, such as oval or rectangular.

To help prevent the traction member 40 from displacing axially (such as in the posterior direction), the recessed seat 30 can include a first retainer, such as hook 58, oriented toward the opposing end (such as the anterior end) of the recessed seat 30, as illustrated in FIG. 8. The hook 58 can be inserted into or connected with a second retainer, such as a pocket 60 as illustrated in FIG. 9, on the traction member 40 to releasably hold an end portion of the traction member 40 to the earstem 20. In some embodiments, the traction member 40 can be made of an elastomeric material that can be stretched so that the pocket 60 can be fitted over the hook 58. The elastomeric material can generally rebound to its original size and provide a compression or tensile force that releasably holds the pocket 60 against the hook 58. In some embodiments, the recessed seat 30 can include a second hook oriented toward the opposite end of the first hook 58 (such as the posterior end) of the earstem 20. The second hook can be particularly advantageous to provide a securing means in embodiments (see, for example, FIG. 12) that do not include a second portion 44 that wraps around the recessed seat 30. In embodiments wherein the traction member 40 is disposed only on the lower portion of the earstem 20, a second hook oriented toward the posterior end of the earstem 20 can secure the posterior end of the traction member 40. The traction member 40 can include a second pocket that can be attached over the second hook. In addition to, or instead of, using interfacing and retaining structures, the traction member 40 and the earstem 20 can be attached to each other using other attachment means such as adhesive, thermobonding, overmolding, sonic welding, solvent bonding, or any other suitable methods and materials.

In some embodiments, the length of the traction member 40 in its resting state (before attachment to the earstem 20) can be slightly shorter than the length of the recessed seat 30 (or the length between respective retaining structures) so that the traction member 40 is axially stretched across at least a portion of the earstem 20 when it is attached thereto. For example, the anterior end of the traction member 40 with a first pocket can be stretched over the first hook to create a pulling or tensile force between the anterior and posterior ends of the traction member 40, which can releasably hold the traction member 40 to the recessed seat 30. In some embodiments, the corresponding opposing force is provided by a second retainer or by a shoulder, such as intermediate shoulder 32. The tension created in the traction member 40 by this stretching method of attachment can help prevent unintentional detachment until a force is applied in a particular direction to remove it.

In some embodiments, the traction member 40 can be coupled to an underlying carrier (not shown) that can act as an adapter for attachment to the earstem 20. The carrier can include mounting features similar to or the same as those described above for the earstem 20 and traction member 40. In some embodiments, the carrier can be generally trough-shaped so as to grip at least a portion of the earstem 20 along opposing sidewalls. The opposing sidewalls of the carrier can be manufactured to be biased to a particular shape and orientation that produces a restoring force to help secure the carrier to the earstem 20. For example, when attached to an earstem 20, the sidewalls of the carrier may be bent outwardly to receive a portion of the earstem 20, which can produce an opposing lateral force against the earstem 20, thereby increasing the force required to remove the carrier. In some embodiments, the carrier can be made of a more rigid material than the traction member 40, such as a harder plastic or composite. The traction member 40 can be attached to the carrier by any means known in the art, such as through adhesives or overmolding. In turn, the carrier can be attached to the earstem 20 through any means described herein or known in the art. In some embodiments, the carrier can be releasably attached to the earstem 20 so that the traction member 40 can be interchanged easily. In some embodiments, the carrier can provide rigidity to the traction member 40 while still preserving the cushion and comfort provided by the elastomeric material of the traction member 40.

Other attachment means may be employed to couple the traction member 40 to the earstem 20, such as providing a bias in the opening or cavity 46 so that the open sides of the traction member 40 are biased towards one another, which in some embodiments can tend to form an enclosed cavity. The bias can be sufficient so that the opposing sides of the traction member 40 cooperatively engage the periphery of the recessed seat 30 and the compression force from the biased sides is sufficient to secure the traction member 40 to the recessed seat 30.

In some embodiments, the attachment means can include one or more complimentary channels and grooves formed respectively in either or both of the earstem 20 or the traction member 40. In some embodiments, the recessed seat can include a flange around which the traction member can be wrapped to secure to the recessed seat. In many embodiments of the attachment means, the traction member is releasably attached to the recessed seat to facilitate easy removal and exchange of the traction member after excessive wear or damage, or when a user desires a different look or fit for the eyewear.

The traction member 40 is preferably comprised of a material having sufficient elasticity that the inner surface 48 of the traction member 40 can be configured to snugly contact the surface of the recessed seat 30 with a cross-sectional area greater than that of the inner surface 48 in the unexpanded state. The inner surface 48 can conform snugly to the surface of a recessed seat 30 having various cross-sectional shapes, such as a circular or rectangular cross-section.

In some embodiments, the traction member 40 may be formed by a molding or extruding processes. The outer surface 49 of the traction member 40 can be configured to enhance the coefficient of static friction between the eyewear and the head. The outer surface 49 may be formed to exhibit a variety of static friction coefficient enhancing configurations, such as ridges, bumps, or textured surface (not shown). In some embodiments, the outer surface 49 produced by extrusion can exhibit axially oriented patterns, while molded outer surfaces may exhibit axially and/or radially oriented patterns.

As discussed infra, the traction member 40 can be formed of an elastomeric material exhibiting sufficient flexibility or elasticity to allow the traction member 40 to expand while being slipped over the earstem posterior end 24 and to contract back against the recessed seat 30 after passing over the posterior end 24.

In some embodiments, the traction member 40 is formed of a relatively soft elastomeric material having a coefficient of sliding friction that increases when the material is wetted.

Such a material, sometimes referred to as hydrophilic, tends to enhance retention of the traction member 40 in position on the wearer's head as the wearer perspires or encounters moisture, as during skiing.

In some embodiments, the traction member 40 can comprise a resilient sponge-like elastomeric material, having a relatively high porosity. In some embodiments, the traction member 40 can comprise a substantially solid, e.g., fine or no porosity, yet flexible material, such as synthetic or natural rubber or rubber-like materials. An example of a material for a traction member 40 is Kraton G polymer. The traction member 40 may be made of materials having different densities, thereby providing traction members 40 having different weights, which may be employed to counterbalance lenses of differing weights, so as to balance the weight of the eyewear 10 more evenly about the head.

Although the traction member 40 is illustrated as extending approximately two-thirds to approximately three-fourths the overall length of the earstem, the traction members 40 can extend anywhere from substantially the entire length of the earstem 20 to only a relatively small portion thereof. A plurality of traction members 40 may be axially aligned within the recessed seat 30. The traction members 40 may be selected so that a combined length of the members 40 substantially equals the distance between the anterior and posterior shoulders 32, 34 or alternatively, the combined axial length of the traction members 40 may be such that an axial space separates adjacent traction members 40 within the recessed seat 30.

On the illustrated embodiment, in assembling the traction member 40 to the earstem 20, the posterior end 24 of the earstem 20 can be passed through the hollow tubular body within the second portion 44 of the traction member 40. In some embodiments, the earstem 20 may be detached from the frame 12 or lens 14 and the anterior end 22 may be passed through the tubular passageway of the traction member 40. The traction member 40 is then moved along the earstem 20 until the inner surface 48 engages the seat 30. Next, the first portion 42 can be coupled to the recessed seat through any of the means discussed above.

In some embodiments where the recessed seat 30 has a length substantially equal to the length of the traction member 40, as the traction member 40 is received within the recessed seat 30, further unintended motion along the earstem 20 is prevented by engagement of the anterior and posterior shoulders 32, 34 with the traction member 40.

The seat 30 may have a sufficient axial length so as to retain a plurality of traction members 40 between the anterior and posterior shoulders 32, 34. The use of multiple traction members 40 allows for accommodating fashion considerations as well as high retaining forces for active uses, such as volleyball or basketball. Upon engagement of the traction member 40 within the seat 30, the outer surface 49 of the traction member 40 may be disposed outside of the periphery of the earstem 20 or may be substantially flush with the periphery 38 of the adjacent earstem 20, as shown in FIG. 11. Traction members can be provided having a variety of wall thicknesses. Thus, the wearer can select a flush fitting traction member as illustrated in FIG. 11 or a radially enlarged traction member, depending upon that wearer's perception of the need for enhanced traction or sleek appearance.

An advantage of certain embodiments includes the ability to releasably attach the traction member 40 to the earstem 20 so that the traction member 40 can be exchanged or replaced. For example, when the traction member 40 becomes worn, it can be replaced with another traction member. In some instances, the traction member 40 can be exchanged with a traction member with a different design, style or material characteristics to suit a particular activity or situation. For active occasions, a secure fitting and cushioned traction member can be attached to the earstem 20. On the other hand, for leisurely occasions a sleeker, more colorful and fashionable traction member can be attached. In some instances, the traction member can be custom molded to the shape and size of the wearer and then attached to a standard earstem for a cost effective, customized fit.

In some embodiments in which the traction members do not surround the entire earstem, there is more freedom in the earstem designs to incorporate better flexural control and flexural stress distribution while not adding to the overall earstem thickness. The freedom in the earstem designs can be enhanced since the size of the earstem does not need to be diminished around its entire periphery to accommodate a full circumferential traction member.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The following is claimed:

1. An improved eyewear, comprising:
   a frame;
   at least one earstem having a recessed seat along a length thereof such that the seat defines a periphery which is smaller than the periphery of an adjacent earstem portion; and
   at least one traction member having an inner surface and an outer surface, said inner surface releasably engaging at least a portion of the periphery of the recessed seat, and said outer surface adapted to provide a contact surface with the head of the wearer;
   wherein at least a portion of the traction member partially surrounds the perimeter of the earstem and at least a portion of the traction member comprises a generally tubular portion.

2. The improved eyewear of claim 1, wherein the at least one traction member is generally flush with the periphery of at least a portion of the adjacent earstem portion.

3. The improved eyewear of claim 1, wherein the recessed seat comprises at least one notch that engages with a complementary protrusion on the traction member.

4. The improved eyewear of claim 3, wherein the at least one notch comprises a cutout having a rounded end that is configured to accept a bulbous portion on the protrusion of the traction member.

5. The improved, eyewear of claim 1, wherein the at least one earstem comprises a non-recessed portion on an end of the earstem configured to obstruct the at least one traction member from uncoupling from the earstem.

6. The improved eyewear of claim 1, wherein the at least one traction member is made of an elastic material.

7. The improved eyewear of claim 1, wherein the at least one traction member is interchangeable.

8. An improved eyewear, comprising:
   at least one earstem having a recessed seat along a length thereof; and
   at least one traction member having an inner surface and an outer surface, said inner surface configured to releasably engage at least a portion of the recessed seat, and said outer surface adapted to provide a contact surface with the head of the wearer,
   wherein the recessed seat comprises at least one slot having a narrow opening in a first region and an enlarged portion in a second region, the slot configured to engage with a complementary protrusion on the inner surface of the traction member, the protrusion configured to deform to be inserted through the narrow opening of the slot and rebound to its original size within the enlarged portion of the slot to help secure the at least one traction member to the recessed seat.

9. The improved eyewear of claim 8, wherein at least a portion of the traction member partially surrounds the perimeter of the earstem and at least a portion of the traction member substantially or completely surrounds the perimeter of the earstem.

10. The improved eyewear of claim 8, wherein the at least one traction member is generally flush with the periphery of at least a portion of the adjacent earstem portion.

11. The improved eyewear of claim 8, wherein the at least one slot comprises a cutout having a rounded end that is configured to accept a bulbous portion on the protrusion of the traction member.

12. The improved eyewear of claim 8, wherein the at least one earstem comprises a non-recessed portion on an end of the earstem configured to obstruct the at least one traction member from uncoupling from the earstem.

13. The improved eyewear of claim 8, wherein the at least one traction member is made of an elastic material.

14. The improved eyewear of claim 8, wherein the at least one traction member is interchangeable.

15. An improved eyewear earstem for customizing eyewear, the earstem comprising:
   an elongate body;
   a first end for attaching the earstem to a frame of the eyewear;
   a second end on the earstem opposite the first end;
   a recessed seat interposed between the first and second ends, the recessed seat having a smaller cross-sectional area than that of the earstem portion adjacent the recessed seat, the recessed seat being situated along the bottom portion of the earstem, and
   at least one traction member removably disposed within the recessed seat along the bottom of the earstem and partially surrounding the earstem, wherein the recessed seat comprises at least one slot having a narrow opening and a wider portion, the slot configured to engage with a complementary protrusion on an inner surface of the traction member, the protrusion configured to deform to be inserted through the narrow opening of the slot and rebound to its original size within the wider portion of the slot to help secure the at least one traction member to the recessed seat.

16. The improved eyewear of claim 15, wherein the at least one traction member is generally flush with the periphery of at least a portion of the adjacent earstem portion.

17. The improved eyewear of claim 15, wherein the at least one slot comprises a cutout having a rounded end that is configured to accept a bulbous portion on the protrusion of the traction member.

18. The improved eyewear of claim 15, wherein the at least one traction member is made of an elastic material.

19. The improved eyewear of claim 15, wherein the at least one traction member is interchangeable.

* * * * *

UNITED STATES PATENT AND TRADEMARK OFFICE
CERTIFICATE OF CORRECTION

PATENT NO. : 8,262,219 B2
APPLICATION NO. : 12/986971
DATED : September 11, 2012
INVENTOR(S) : Duane J. Lee et al.

It is certified that error appears in the above-identified patent and that said Letters Patent is hereby corrected as shown below:

In the Claims:

Column 10, Line 64, In Claim 5, change "improved," to --improved--.

Signed and Sealed this
Twenty-first Day of May, 2013

Teresa Stanek Rea
*Acting Director of the United States Patent and Trademark Office*